United States Patent Office 3,396,063
Patented Aug. 6, 1968

3,396,063
LACQUER AND GLUE AND PROCESSES
OF USING THE SAME
Jean-Marie Massoubre, Clermont-Ferrand, France, assignor to Compagnie Generale des Établissements Michelin, raison sociale Michelin & Cie, Clermont-Ferrand, Puy-de-Dome, France
No Drawing. Filed Jan. 21, 1964, Ser. No. 339,092
Claims priority, application France, Jan. 23, 1963, 922,357
10 Claims. (Cl. 156—331)

The present invention relates to a lacquer and glue based on unsaturated polyester and modified organic polyisocyanate and further relates to a process of using the same for the protective coating of metallic surfaces against corrosion and for the gluing of polyurethane elastomers thereon.

The presently known polyisocyanate-based lacquers and glues used for bonding or cementing polyurethane elastomers to metallic surfaces are not stable. Their viscosity advances on aging and after only a few hours their homogeneity is no longer sufficient for the purpose of their being applied uniformly to the surface to be coated. Furthermore, the development of these glues results in a rapid lowering of their adhesive strength and, in order to obtain satisfactory adherence, the glue coat must be comparatively thick, thereby lacking elasticity and keeping badly on metallic surfaces subjected to heavy deformation. It has heretofore been proposed that such glue be stabilized, for example, by masking the isocyanate groups contained in them so that they are set free only at the time of use. However, such a solution to this problem is complicated and is suitable only for polyurethane elastomers which may be vulcanized by isocyanates and is not suitable for polyurethane elastomers which are vulcanized by peroxides inasmuch as the substances masking the isocyanate groups prevent vulcanization by peroxides.

Furthermore, the presently known glues based on unsaturated polyesters, polyisocyanate and styrene, due to the presence of the styrene therein are incompatible with polyurethane elastomers to be bonded to metallic surfaces.

Accordingly, an object of the present invention is to provide a lacquer or glue which differs advantageously from the lacquers or glues known to date in that it remains stable on storage for a long time; in that it is possible to use a very thin layer only having a thickness of about one micron on metallic surfaces and still obtain excellent adhesion of polyurethane elastomers on these metallic surfaces; in that this slight thickness of lacquer or glue makes it possible to obtain durable coatings on metallic surfaces which are very flexible and can be subjected to repeated bending; in that the layer of lacquer or glue applied to the metallic surface protects the metal from corrosion after the lacquer coating has been cured; in that the metallic surfaces thus coated may be cemented to polyurethane elastomers even after several weeks of storage of the coated metal; and finally in that this glue is equally as suitable for the cementing of polyurethane elastomers which are vulcanized by peroxides as for the cementing of polyurethane elastomers vulcanized by isocyanates.

The lacquer or glue in accordance with the present invention is a solution comprising an organic solvent, for example, ethyl acetate, acetone or methylethylketone, and a solute mixture dissolved therein of (1) an organic polyisocyanate, (2) an unsaturated polyester resin, (3) an unsaturated modifying agent providing at least one functional group which is reactive with respect to the free isocyanate groups of the polyisocyanate, and (4) an organic peroxide cross-linking or curing agent for the glue.

The organic polyisocyanate (1) is preferably an addition product of an organic diisocyanate and a polyol, i.e., a polyhydric alcohol. Typical examples thereof include the addition products of 2,4-toluene diisocyanate and 1,2,6-hexanetriol or pentaerythritol, e.g., the ratio of at least three moles, and by preference 3.3 moles, of 2,4-toluene diisocyanate per mole of 1,2,6-hexanetriol.

The unsaturated polyester resin (2) is a product of the condensation of one or more unsaturated aliphatic dicarboxylic acids such as maleic, fumaric or itaconic acids, with one or more saturated aliphatic dihydric alcohols, i.e., diols, such as ethyleneglycol, diethyleneglycol, propylene glycol, etc. The condensation product can further contain as a unit thereof a saturated aliphatic dicarboxylic acid or an aromatic dicarboxylic acid such as adipic, succinic or terephthalic acids. Preferably, the amount of unsaturated aliphatic dicarboxylic acids is at least 20% of the total weight of the diacids used in forming the unsaturated polyester resin.

The unsaturated polyester resin has a hydroxyl number and an acid number both ranging from 20 to 120, preferably from 50 to 100. It is used in the lacquer and glue in an amount of from about 10% to about 200%, preferably from about 30% to about 100%, based on the weight of the polyisocyanate.

The unsaturated modifying agent (3) is an unsaturated alcohol, amine or amino alcohol having vinyl or allyl groups such as allyl alcohol, diallyl carbinol, diallyloxypropanol, the diallyl ether of trimethylolpropane, the monoallyl ether of propylene glycol, allyl vinyl carbinol, allyl-propenyl carbinol, allylamine, diallylamine, diallylamino ethanol, etc. This unsaturated modifying agent contains at least one function which reacts with the free isocyanate groups of the polyisocyanate and it is used in the lacquer and glue in an amount of from about 0.1 to about 0.4 mole, preferably from about 0.25 to about 0.35 mole, per free isocyanate group. The presence of this modifying agent for polyisocyanates assures good gluing of a polyurethane elastomer to a metallic surface.

The organic peroxide (4), for example, benzoyl peroxide or cumene hydroperoxide, is used in quantities ranging from about 1% to about 6% by weight of the unsaturated polyester resin used.

A further object of the invention is to provide a method for the protection of metallic surfaces against corrosion. This method comprises applying a coating of the lacquer or glue of the invention to a metallic surface, such as a metal plate or metal cable, and submitting this coating of lacquer to curing at a temperature ranging from about 150° C. to about 300° C. for approximately 1 to 15 minutes in order to harden the coating.

An additional object of the invention is to provide a method of assembling by gluing of a polyurethane elastomer which may be vulcanized by either an organic peroxide or by an isocyanate onto a metallic surface by making use of the glue of the invention. This method comprises two stages.

In the first stage, a coating of the glue of the invention is applied to the surface of the metal object to be joined with the polyurethane elastomer object and this coating of glue is cured at a temperature ranging from about 150° C. to about 300° C. for approximately 1 to 15 minutes in order to harden the coating.

In the second stage, a polyurethane elastomer is applied to the hardened lacquer or glue coated metallic surface and both are vulcanized at conventional vulcanization temperatures under a pressure of at least 3 kg./cm.$^2$.

It is possible to store the metal object to which the hardened coating of glue has been applied during the first stage for a prolonged period prior to undertaking the second stage of the method inasmuch as the hardened glue coating preserves its adhesive strength for a long period as regards polyurethane elastomers and protects the metal article against corrosion.

The invention will be further illustrated by the following examples.

EXAMPLE 1

In an Erlenmeyer flask with a ground stopper there was weighed 1.34 g. of 1,2,6-hexanetriol to which there was added 20 cc. of distilled ethyl acetate. Thereafter, there was added into the flask 5.74 g. of 2,4-toluene diisocyanate. The stoppered flask was then agitated keeping it lukewarm until a clear solution was obtained. After cooling, there was added 0.97 g. of diallylamine, thereafter the solution was agitated slightly and then the flask was filled to 75 cc. with distilled ethyl acetate. Solution A was obtained thereby.

In order to obtain solution B, there was weighed in a beaker 4 g. of an unsaturated polyester resin prepared by causing maleic anhydride and ethylene glycol to react together. This polyester resin had an acid number of about 80. Twenty cc. of distilled ethyl acetate was added thereto and the mixture was heated slowly to 50° C. in order to cause complete dissolution of the polyester resin. After cooling, 0.16 g. of cumene hydroperoxide was added and the volume of the solution was increased to 40 cc. by adding distilled ethyl acetate to it.

The lacquer or glue in accordance with the invention was obtained by mixing 75 cc. of solution A with 37.5 cc. of Solution B.

The surface of a steel plate destined to adhere to a polyurethane elastomer plate was coated with this glue and the coated steel plate was heated at 200° C. for 2 minutes. A polyurethane elastomer plate was placed on the surface of the coated metal plate and the laminate vulcanized under a pressure of 3.5 kg./cm.$^2$. The adhesive strength measured after vulcanization was of 146 kg./cm.$^2$.

The adhesive strength was not substantially diminished when the glue which had been prepared as described above was not used immediately after having been prepared, as is shown by the following results, which give the adhesive strength after aging of the glue.

| Time of aging of glue (days): | Adhesive strength (kg./cm.$^2$) |
|---|---|
| 0 | 146 |
| 2 | 140 |
| 6 | 132 |

Likewise, the quality of cementing was not substantially changed by storage of the glue-coated metal plate in the air for several weeks prior to cementing the polyurethane elastomer thereto. This is proved by the following measurements:

| Time (in days) of storage of the glue-coated metal plate: | Adhesive strength (kg./cm.$^2$) |
|---|---|
| 0 | 146 |
| 3 | 130 |
| 5 | 140 |
| 7 | 135 |
| 14 | 137 |
| 21 | 132 |

EXAMPLE 2

Solutions A and B were prepared as in Example 1, but solution A was filled up so that its final volume was 150 cc. and the volume of solution B was brought up to 80 cc., both by adding distilled ethyl acetate thereto.

The two solutions A and B were mixed together to form a glue. This glue was coated on the surface of a cable consisting of 5 steel wires of 0.23 mm. diameter each, destined to adhere to a polyurethane elastomer. The coated steel cable was heated to 200° C. for 10 minutes whereafter the coated cable was placed between two polyurethane elastomer plates and the assembly vulcanized under a pressure of 7 kg./cm.$^2$. The adhesive strength measured by stretching of the cable after vulcanization was 30.5 kg. for a glued cable length of 5 mm.

The adhesive strength was not substantially diminished after aging of the glue prior to coating the cable therewith as shown by the following data.

| Time of aging of the glue (days): | Adhesive strength (kg./5 mm. of glued cable) |
|---|---|
| 0 | 30.5 |
| 2 | 30.2 |
| 6 | 29 |

EXAMPLES 1–21

Other examples of lacquers and glues demonstrating the invention are grouped in Table I below (including the preceding Examples 1 and 2). The lacquers and glues were prepared in accordance with the same conditions as those given in Example 1 for the gluing on metal plates and under the same conditions as those given in Example 2 for the gluing on metal cables. In Table I, the following abbreviations are used:

EA—ethyl acetate
AC—acetone
MEK—methylethyl ketone
HT—1,2,6-hexanetriol
PE—pentaerythritol
TDI—2,4-toluene diisocyanate
DAA—diallyl amine
DAC—diallyl carbinol
DATP—diallyl oxytrimethylolpropane (diallyl ether of trimethylol propane)
DAP—diallyloxypropanol
AA—allyl alcohol
CHP—cumene hydroperoxide
Resin A—a resin prepared by causing the reaction of maleic anhydride with ethylene glycol, in equimolar proportions, and arresting the reaction at an acid number of about 80.
Resin B—a resin similar to resin A but with an acid number of 90.
Resin C—a resin similar to resin A but with an acid number of 115.
Resin D—a resin prepared by causing the reaction of maleic anhydride with propylene glycol and ethylene glycol in molar proportions of 1/0.3/0.7, respectively, and stopping the reaction at an acid number of 95.
Resin E—a resin prepared by causing the reaction of adipic acid and maleic anhydride with ethylene glycol in molar proportions of 0.3/0.7/1, respectively, and arresting the reaction at an acid number of about 90.
Resin F—a resin prepared as resin A but plasticized by the addition to such resin of styrene in an amount of 50% by weight.

In Table I below Examples 16, 20 and 21 are comparative examples outside the scope of the present invention, while the remaining examples are illustrative of the glues and lacquers of the invention.

glue of the invention where an unsaturated polyester resin with an acid number in excess of 100 was used, adherence which was 125 kg./cm.$^2$ (gluing on plate) is acceptable but is clearly below the adherence obtained with a preferred glue of Example 1.

The adhesive strength was not substantially diminished

TABLE I

| Example No. | Solution A | | | Modifying Agent (g.) | Solution B | | |
|---|---|---|---|---|---|---|---|
| | Solvent (cc.) | Polyol (g.) | Diisocyanate (g.) | | Solvent (cc.) | Resin (g.) | Peroxide (g.) |
| 1 | 75 EA | 1.34 HT | 5.74 TDI | 0.97 DAA | 40 EA | 4 Resin A | 0.16 CHP |
| 2 | 150 EA | 1.34 HT | 5.74 TDI | 0.97 DAA | 80 EA | 4 Resin A | 0.16 CHP |
| 3 | 150 EA | 1.34 HT | 5.74 TDI | 1.74 DAP | 80 EA | 4 Resin A | 0.16 CHP |
| 4 | 150 EA | 1.34 HT | 5.74 TDI | 2.14 DATP | 80 EA | 4 Resin B | 0.16 CHP |
| 5 | 150 EA | 1.34 HT | 5.74 TDI | 2.83 DATP | 80 EA | 4 Resin B | 0.16 CHP |
| 6 | 150 EA | 1.34 HT | 5.74 TDI | 1.12 DAC | 80 EA | 4 Resin B | 0.16 CHP |
| 7 | 150 EA | 1.34 HT | 5.74 TDI | 0.58 AA | 80 EA | 4 Resin B | 0.16 CHP |
| 8 | 150 EA | 1.34 HT | 5.74 TDI | 0.71 DAA | 80 EA | 4 Resin B | 0.16 CHP |
| 9 | 150 EA | 1.34 HT | 5.74 TDI | 1.20 DAA | 80 EA | 4 Resin B | 0.16 CHP |
| 10 | 150 EA | 1.36 PE | 5.74 TDI | 0.97 DAA | 80 EA | 4 Resin B | 0.16 CHP |
| 11 | 150 EA | 1.34 HT | 5.74 TDI | 0.97 DAA | 80 EA | 1.5 Resin B | 0.10 CHP |
| 12 | 150 EA | 1.34 HT | 5.74 TDI | 0.97 DAA | 80 EA | 6 Resin B | 0.24 CHP |
| 13 | 150 EA | 1.34 HT | 5.74 TDI | 0.97 DAA | 80 EA | 4 Resin B | 0.16 CHP |
| 14 | 150 EA | 1.34 HT | 5.74 TDI | 0.97 DAA | 80 EA | 4 Resin E | 0.16 CHP |
| 15 | 75 EA | 1.34 HT | 5.74 TDI | 0.97 DAA | 40 EA | 4 Resin C | 0.16 CHP |
| 16 | 75 EA | 1.34 HT | 5.74 TDI | 0.97 DAA | 40 EA | 6 Resin F | 0.20 CHP |
| 17 | 150 EA | 1.34 HT | 7.80 TDI | 0.97 DAA | 80 EA | 4 Resin A | 0.16 CHP |
| 18 | 150 MEK | 1.34 HT | 5.74 TDI | 0.97 DAA | 80 MEK | 4 Resin A | 0.16 CHP |
| 19 | 150 AC | 1.34 HT | 5.74 TDI | 0.97 DAA | 80 AC | 4 Resin A | 0.16 CHP |
| 20 | 150 EA | 1.34 HT | 5.74 TDI | None | 80 EA | 4 Resin A | 0.16 CHP |
| 21 | 75 EA | 1.34 HT | 5.74 TDI | None | 40 EA | 4 Resin A | 0.16 CHP |

The lacquers and glues given in Table I above were used in gluing a polyurethane elastomer to steel plates or steel cables under the conditions set forth in Examples 1 and 2 and their adhesive strengths were measured. In Table II below their adhesive strength on a steel plate is given in kg./cm.$^2$, and adhesive strength on a steel cable is expressed in kg./5 mm. of glued cable.

TABLE II

| Example No. | Gluing On— | Adhesive Strength |
|---|---|---|
| 1 | Plate | 146 |
| 2 | Cable | 30.5 |
| 3 | do | 28.8 |
| 4 | do | 29 |
| 5 | do | 25.9 |
| 6 | do | 26.8 |
| 7 | do | 27.8 |
| 8 | do | 27.6 |
| 9 | do | 27.8 |
| 10 | do | 28.5 |
| 11 | do | 29 |
| 12 | do | 27 |
| 13 | do | 26.9 |
| 14 | do | 25.6 |
| 15 | Plate | 125 |
| 16 | do | 103 |
| 17 | Cable | 31 |
| 18 | do | 29.2 |
| 19 | do | 29.7 |
| 20 | do | 23 |
| 21 | Plate | 109 |

As will be seen from Tables I and II, in the case of comparative Example 16 in which there was used a conventional unsaturated polyester resin containing styrene plasticizer, adherence was especially mediocre. It was only 103 kg./cm.$^2$ (gluing on plate) as against 146 kg./cm.$^2$ for the glue in accordance with the invention as described in Example 1.

Mediocre adhesive strength was also obtained in comparative Examples 20 and 21 in which the unsaturated modifying agent was not present in the glues. Adherence in the case of gluing on a steel plate was only 109 kg./cm.$^2$ (Example 21) as against 146 kg./cm.$^2$ for the glue in accordance with the invention described in Example 1, and adherence in the case of gluing on a steel cable was only 23 kg./5 mm. of glued cable (Example 20) as against 30.5 kg./5 mm. of glued cable for the glue in accordance with the invention described in Example 2.

Furthermore in Example 15 illustrating a non-preferred when the glues were not used immediately after having been prepared, as is shown by the data in Table III below.

TABLE III

| Example No. | Gluing On— | Adhesive strength (Kg./cm.$^2$) after aging | | |
|---|---|---|---|---|
| | | 0 day | 2 days | 6 days |
| 1 | Plate | 146 | 140 | 132 |
| 2 | Cable | 30.5 | 30.2 | 29 |
| 18 | do | 29.2 | 29.7 | 28.4 |
| 19 | do | 29.7 | 28.6 | 29.3 |

The use of the lacquer or glue in accordance with the invention is not limited to any one metal or alloy. Excellent results have been obtained on steel, brass-plated steel, solid brass and duraluminum.

What is claimed is:

1. A lacquer and glue especially adapted for the protection of metallic surfaces against corrosion and for the gluing without other glues of polyurethane elastomers thereon which is a solution comprising an organic solvent and a solute mixture dissolved therein of (1) an organic polyisocyanate, (2) from about 10% to about 200% based on the weight of the polyisocyanate of an unsaturated polyester resin free of styrene plasticizer having a hydroxyl number and an acid number both ranging from 20 to 120, (3) from about 0.1 to about 0.4 mole per free isocyanate groups in the polyisocyanate of an unsaturated compound which is reactive with respect to isocyanate, said unsaturated compound having an unsaturated radical selected from the group consisting of vinyl and allyl and having a functional group selected from the group consisting of amine and alcohol, and (4) from about 1% to about 6% based on the weight of the polyester resin of an organic peroxide.

2. A lacquer and glue as set forth in claim 1 wherein the organic solvent is selected from the group consisting of ethyl acetate, acetone and methyl ethyl ketone.

3. A lacquer and glue as set forth in claim 1 wherein the organic polyisocyanate is the addition product of an organic diisocyanate and a polyhydric alcohol.

4. A lacquer and glue as set forth in claim 3 wherein the organic polyisocyanate is the addition product of 2,4-toluene diisocyanate and a polyhydric alcohol selected from the group consisting of 1,2,6-hexanetriol and pentaerythritol.

5. A lacquer and glue as set forth in claim 1 wherein the unsaturated polyester resin is the condensation product of an unsaturated aliphatic dicarboxylic acid and a saturated aliphatic dihydric alcohol.

6. A lacquer and glue as set forth in claim 5 wherein the unsaturated polyester resin is selected from the group consisting of the condensation products of (a) maleic anhydride and ethylene glycol, (b) maleic anhydride, ethylene glycol and propylene glycol, and (c) maleic anhydride, adipic acid and ethylene glycol.

7. A lacquer and glue as set forth in claim 1 wherein the unsaturated compound which is reactive with respect to isocyanate is selected from the group consisting of diallyl carbinol, diallyloxypropanol, diallyl ether of trimethylol propane, allyl alcohol, monoallyl ether of propylene glycol, allylvinyl carbinol, allylpropenyl carbinol, diallylaminoethanol, allyl amine and diallylamine.

8. A lacquer and glue as set forth in claim 1 wherein the organic peroxide is selected from the group consisting of benzoyl peroxide and cumene hydroperoxide.

9. A method for the protection of metallic surfaces against corrosion which comprises applying a coating of a lacquer and glue which is a solution comprising an organic solvent and a solute mixture dissolved therein of (1) an organic polyisocyanate, (2) from about 10% to about 200% based on the weight of the polyisocyanate of an unsaturated polyester resin free of styrene plasticizer having a hydroxyl number and an acid number both ranging from 20 to 120, (3) from about 0.1 to about 0.4 mole per free isocyanate groups in the polyisocyanate of an unsaturated compound which is reactive with respect to isocyanate, said unsaturated compound having an unsaturated radical selected from the group consisting of vinyl and allyl and having a functional group selected from the group consisting of amine and alcohol, and (4) from about 1% to about 6% based on the weight of the polyester resin of an organic peroxide, to the metallic surface and heating the coating at a temperature from about 150° C. to about 300° C. for from about 1 to about 15 minutes to harden the coating.

10. A method for gluing a polyurethane elastomer to a metallic surface which comprises the process steps defined by claim 9 followed by applying a polyurethane elastomer to the hardened lacquer coated metallic surface and vulcanizing the polyurethane elastomer and lacquer coating with heat and under a pressure of at least 3 kg./cm.²

References Cited

UNITED STATES PATENTS

| 2,965,615 | 12/1960 | Tess | 260—77.5 |
| 3,178,380 | 4/1965 | Porret | 260—77.5 |
| 3,210,302 | 10/1965 | Bowell et al. | 260—75 |
| 3,229,013 | 1/1966 | Newton et al. | 264—229 |
| 3,252,819 | 5/1966 | Cobb | 260—75 |
| 3,255,069 | 6/1966 | Crowley et al. | 161—190 |
| 2,593,829 | 4/1952 | Arledter et al. | 161—214 X |
| 2,642,920 | 6/1953 | Simon et al. | 161—190 X |
| 2,850,424 | 9/1958 | Finelli et al. | 161—190 X |
| 2,936,293 | 5/1960 | Orth | 161—190 X |
| 2,953,489 | 9/1960 | Young | 156—331 |
| 2,992,939 | 7/1961 | Larson et al. | 156—331 X |
| 3,111,450 | 11/1963 | Stevens | 161—190 X |
| 3,208,894 | 9/1965 | Yanagihara et al. | 156—331 X |

OTHER REFERENCES

Dombrow, B. A., "Polyurethanes," Reinhold Pub. Corp., New York, 1957, pages 142–145 and 111.

"Polyurethanes," Dombrow, Reinhold Pub. Corp., New York, copyright 1957, pages 143, 144.

EARL M. BERGERT, *Primary Examiner.*

C. B. COSBY, *Assistant Examiner.*